United States Patent
Periaswamy et al.

(10) Patent No.: US 7,961,923 B2
(45) Date of Patent: Jun. 14, 2011

(54) METHOD FOR DETECTION AND VISIONAL ENHANCEMENT OF BLOOD VESSELS AND PULMONARY EMBOLI

(75) Inventors: Senthil Periaswamy, Malvern, PA (US); Marcos Salganicoff, Philadelphia, PA (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 967 days.

(21) Appl. No.: 11/841,168

(22) Filed: Aug. 20, 2007

(65) Prior Publication Data

US 2008/0050003 A1   Feb. 28, 2008

Related U.S. Application Data

(60) Provisional application No. 60/839,288, filed on Aug. 22, 2006, provisional application No. 60/839,278, filed on Aug. 22, 2006.

(51) Int. Cl.
*G06K 9/00*   (2006.01)
(52) U.S. Cl. ......... 382/128; 382/130; 382/134; 600/407
(58) Field of Classification Search ............... 382/128, 382/134, 108, 173, 224, 225, 133, 130, 132, 382/181, 190, 195; 600/424, 485, 419, 407, 600/481; 378/4–27
See application file for complete search history.

(56) References Cited

U.S. PATENT DOCUMENTS

| | | | |
|---|---|---|---|
| 6,379,303 B1* | 4/2002 | Seitz et al. | 600/438 |
| 7,526,115 B2* | 4/2009 | Bogoni et al. | 382/131 |
| 7,529,395 B2* | 5/2009 | Cathier et al. | 382/128 |
| 7,621,875 B2* | 11/2009 | Pravica et al. | 600/481 |
| 2005/0152588 A1* | 7/2005 | Yoshida et al. | 382/128 |
| 2005/0185838 A1* | 8/2005 | Bogoni et al. | 382/165 |
| 2006/0120591 A1 | 6/2006 | Cathier | |

OTHER PUBLICATIONS

Yoshida et al., "Three-Dimensional Computer-Aided Diagnosis Scheme for Detection of Colonic Polyps", IEEE Transactions on Medical Imaging, IEEE Service Center, Piscataway, NJ, vol. 20, No. 12, Dec. 2001, pp. 1261-1274.

Frimmel et al., "Virtual Endoscopic Visualization of the Colon by Shape-Scale Signatures", IEEE Transactions on Information Technology in Biomedicine, IEEE Service Center, Los Alamitos, CA, vol. 9, No. 1, Mar. 2005, pp. 120-131.

* cited by examiner

*Primary Examiner* — Daniel G Mariam
*Assistant Examiner* — Nancy Bitar
(74) *Attorney, Agent, or Firm* — Peter Withstandley

(57) ABSTRACT

A method for detecting a substantially cylindrical internal structures and dark structures surrounded by bright intensity values (contrast) in a medical image includes acquiring a medical image. A gradient of the medical image is calculated. Local shape index information for the calculated gradient of the medical image is calculated. Gradient information having a local shape index not indicative of a ridge and rut shapes is removed. Diverging gradient field responses (DGFR) are calculated based on the remaining gradient information. The DGFR responses and relative amount of DGFR responses for the rut and ridge areas is used as a discriminative feature in detecting the substantially cylindrical internal structure as well as darker occluding structures within cylindrical structures such as Pulmonary Emboli.

26 Claims, 4 Drawing Sheets

| Surface Type | Shape Index Range |
|---|---|
| Spherical Cup | $si \in [-1, -7/8]$ |
| Trough | $si \in [-7/8, -5/8]$ |
| Rut | $si \in [-5/8, -3/8]$ |
| Saddle Rut | $si \in [-3/8, -1/8]$ |
| Saddle | $si \in [-1/8, +1/8]$ |
| Saddle Ridge | $si \in [+1/8, +3/8]$ |
| Ridge | $si \in [+3/8, +5/8]$ |
| Dome | $si \in [+5/8, +7/8]$ |
| Spherical Cap | $si \in [+7/8, +1]$ |

Fig. 1

| Surface Type | Shape Index Range |
|---|---|
| Spherical Cup | $si \in [-1, -7/8]$ |
| Trough | $si \in [-7/8, -5/8]$ |
| Rut | $si \in [-5/8, -3/8]$ |
| Saddle Rut | $si \in [-3/8, -1/8]$ |
| Saddle | $si \in [-1/8, +1/8]$ |
| Saddle Ridge | $si \in [+1/8, +3/8]$ |
| Ridge | $si \in [+3/8, +5/8]$ |
| Dome | $si \in [+5/8, +7/8]$ |
| Spherical Cap | $si \in [+7/8, +1]$ |

METHOD FOR DETECTION AND VISIONAL ENHANCEMENT OF BLOOD VESSELS AND PULMONARY EMBOLI

CROSS-REFERENCE TO RELATED APPLICATION

The present application is based on provisional application Ser. No. 60/839,288 filed Aug. 22, 2006 and 60/839,278 filed Aug. 22, 2006, the entire contents of which are herein incorporated by reference.

BACKGROUND OF THE INVENTION

1. Technical Field

The present disclosure relates to visual enhancement and detection and, more specifically, to a method for detecting and visually enhancing blood vessels and pulmonary emboli.

2. Discussion of the Related Art

Medical imaging is the field of visualizing the internal structure of a patient subject using fields that are able to penetrate the body of the subject. Examples of common medical imaging techniques include traditional x-rays, computed tomography (CT), magnetic resonance (MR), ultrasound, positron emission tomography (PET), and the like.

While medical imaging techniques such as traditional x-rays provide a two-dimensional image, many modern medical imaging techniques, such as CT, provide a three-dimensional image by combining multiple two-dimensional image slices into a three-dimensional computer model that can be viewed from a wide variety of angles and depths.

By imaging the internal structure of the patient subject, injury, disease and congenital defect may be identified and treated. Traditionally, medical imaging techniques resulted in the display of a medical image, either on a film or on a computer display allowing a clinician such as a radiologist to examine the medical image to render a diagnosis.

However, it is possible for clinicians to miss small abnormalities in medical images and thus abnormalities may go unnoticed. Because diseases such as cancers are most treatable at early stages, early detection of abnormalities may be lead to reduced mortality and morbidity.

Moreover, proper review of medical images may take a long time. With the increased costs of medical care, the increased use of medical imagery, and the limited availability of qualified practitioners, it is becoming increasingly burdensome for qualified medical practitioners to properly review each and every medical image.

This problem is compounded by the added precision of modern medical imaging devices that are able to capture images at high resolutions and in three dimensions. The higher resolution means that the practitioner must more closely analyze each section of the medical image to determine if early signs of disease are visible from among the captured pixels. Moreover, three-dimensional medical images may require careful examination at many different levels of depth. In fact, as the pixel density of medical images increases due to higher resolution scans and more image slices, manually examining all of the collected data may be nearly impossible for a medical practitioner.

SUMMARY

A method for detecting a substantially cylindrical internal structures in a medical image includes acquiring a medical image. A gradient of the medical image is calculated. Local shape index information for the calculated gradient of the medical image is calculated. Gradient information having a local shape index not indicative of a ridge shape is removed. A diverging gradient field response (DGFR) is calculated based on the remaining gradient information. The DGFR is used as a discriminative feature in detecting the substantially cylindrical internal structure.

A method for detecting an occlusion of a substantially cylindrical internal structure in a medical image includes acquiring a medical image. A gradient of the medical image is calculated. Local shape index information is calculated based on the calculated gradient of the medical image. Gradient information having local shape index information not indicative of a rut shape is removed. The remaining gradient information is inverted. A diverging gradient field response (DGFR) is calculated based on the inverted remaining gradient information. The DGFR is used as a discriminative feature in detecting the occlusion of the substantially cylindrical internal structure.

A method for detecting a desired internal structure from within a medical image in a medical image processing device includes acquiring a medical image. A gradient of the medical image is calculated. Local shape index information for the calculated gradient of the medical image is calculated. The calculated local shape index information is normalized within the range of $[-1, +1]$. Gradient information having a local shape index not indicative of a predetermined shape is removed. A diverging gradient field response (DGFR) is calculated based on the remaining local shape index information. The DGFR response is used as a discriminative feature in detecting the desired internal structure. Additionally, the DGFR response over the desired internal structure is displayed as a visual enhancement superimposed on the medical image.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 1 is a scale for interpretation of a local shape index;

DETAILED DESCRIPTION OF THE DRAWINGS

Figure 2:
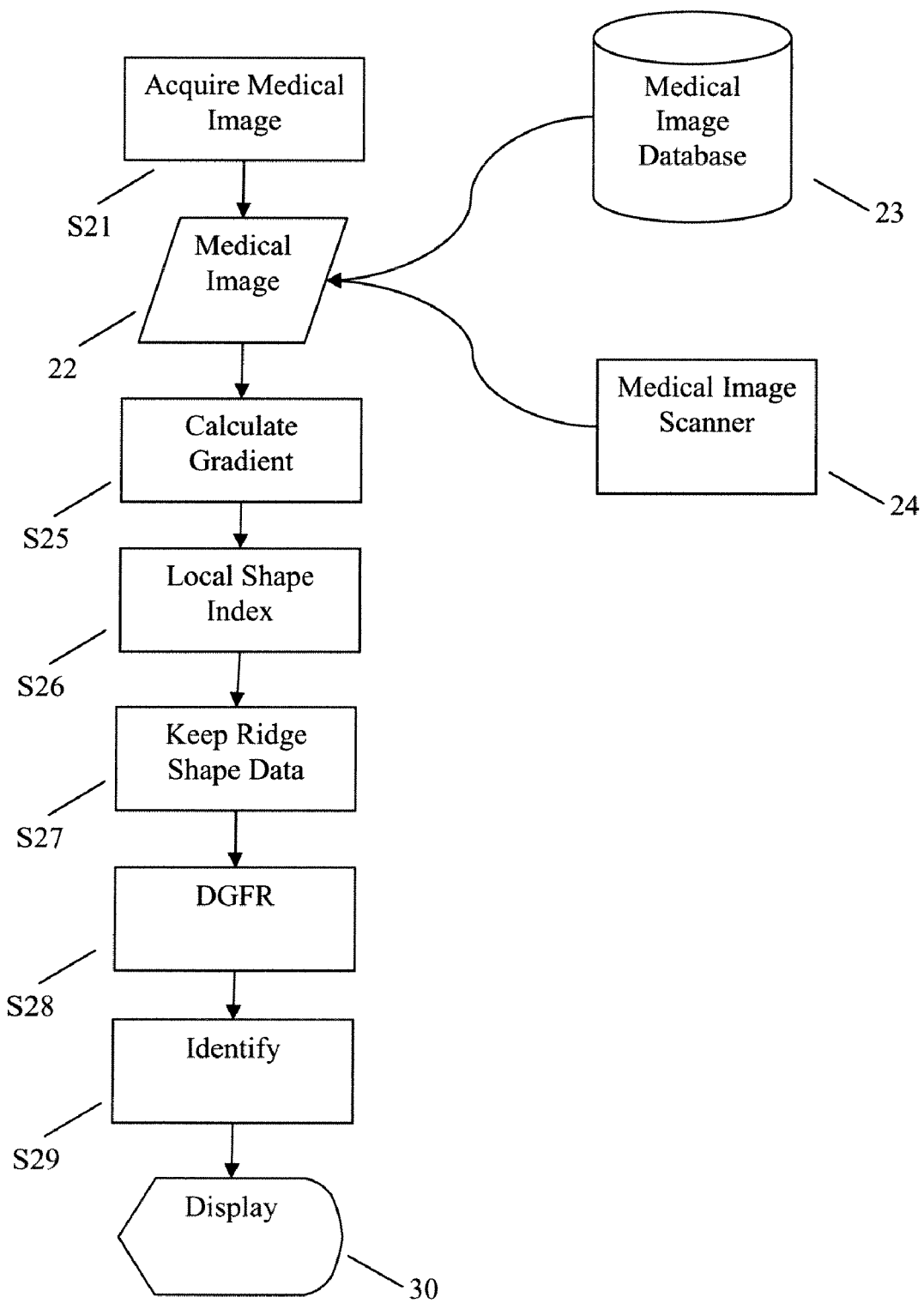
FIG. 2 is a flow chart showing a method for detecting a substantially cylindrical internal structure in a medical image according to an exemplary embodiment of the present invention.

In describing the exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Computer aided detection (CAD) is the process of using a computer to either detect a desired structural feature within an image or identifying portions of the image that may represent the desired structural feature. Exemplary embodiments of the present invention seek to utilize computerized detection within medical images to allow for the automatic detection of suspicious regions. By using computerized detection, the attention of medical practitioners may be quickly directed to regions of the medical image that have the highest probability of abnormality, or another such region of interest. By focusing attention on these regions of interest, medical practitioners may more quickly and accurately render diagnoses and thus patient mortality and morbidity may be reduced and scarce medical resources may be conserved.

CAD systems for automatically detecting pulmonary emboli (PE) may include: segmentation of the lung within a medical image, generating a list of candidate regions that could possibly be a PE, extracting features about the candidate regions, and classifying the candidate regions based on the features extracted per candidate.

For a medical practitioner concerned with the examination of blood vessels within the internal structure of the patient subject, computerized detection may be used to identify the blood vessels from among the other structural features of the medical images, for example, based on their substantially cylindrical shape. Blood vessels may be visualized in key areas of the body, for example, brain, kidneys, pelvis, legs, lungs, heart and neck. Once detected, a medical practitioner may more quickly and easily focus on the blood vessels of interest. Blood vessels may be examined, for example, for signs of disease or structural abnormalities. Visualization of blood vessels may also help prepare for medical treatments such as surgery and related procedures or to otherwise visualize the path of circulation within the subject patient.

Of particular importance is the visualization and identification of pulmonary emboli. A pulmonary embolism (PE) is a blockage of a pulmonary artery or one of its branches. PE may result from a blood clot in a vein dislodging from its site of formation that travels through the blood stream until it becomes lodged in the arterial blood supply of a lung, a process known as thromboembolism.

Exemplary embodiments of the present invention utilize a set of features about the candidate regions, for example, vessel features and pulmonary emboli features, which may be scalar values and may indicate a degree to which local structures conform to properties indicative of a vessel and/or pulmonary emboli. These features may then be used, along with other discriminative features, for example, intensity and texture, during classification to increase detection accuracy. In particular, a strong simultaneous DGFR response of the tubular structure and PE could be used by a statistical classifier to increase detection accuracy, since this would correspond to a dark compact structure (occluding PE) internal to a tubular enclosing structure (artery).

According to exemplary embodiments of the present invention, the substantially cylindrical shape of blood vessels may be used to automatically perform accurate vessel identification. When imaged in gray scale, for example by CT scan, blood vessels may appear as a lightly colored cylindrical structure within a dark background. This may be due to the presence of contrast in the blood vessels. The gray scale medical image, here a CT scan, may be expressed as a function of three spatial dimensions: L(x,y,z).

Derivatives of the gray scale medical image may be calculated. The partial derivative of L with respect to the x direction is $L_x$, the partial derivative of L with respect to the y direction is $L_y$, and the partial derivative of L with respect to the z direction is $L_z$. Second derivatives may be similarly expressed, for example, the second partial derivative of L with respect to x is $L_{xx}$ and the derivative with respect to y of the partial derivative of L with respect to x ($L_x$) is $L_{xy}$.

The calculated gradient may thus be expressed as:

$$\nabla L = \begin{bmatrix} L_x \\ L_y \\ L_z \end{bmatrix}$$

The gradient ∇L includes the vectors of partial derivatives along each axis of the three spatial dimensions. The computed gray scale derivatives will tend to point in a diverging pattern normal to the cylindrical structure of the vessels. This is because the gradient direction at a point is the direction of steepest ascent at that point. Because there is a steep ascent from the lightly colored vessel structure to the dark colored surrounding structure, the gradient direction is normal to the circumference of the vessel.

The derivatives may then be normalized to a set of three-dimensional unit vectors. Next, local shape index information may be computed based on the normalized derivatives. Shape indexing is an approach to mathematically characterizing shapes according to their differential geometry. The shape index may be calculated from the Hessian matrix (H). The Hessian matrix is the square matrix of second order partial derivatives. The Hessian matrix may be calculated as follows:

$$H = \begin{bmatrix} L_{xx} & L_{xy} & L_{xz} \\ L_{yx} & L_{yy} & L_{yz} \\ L_{zx} & L_{zy} & L_{zz} \end{bmatrix}$$

Eigenvalues and Eigenvectors may be calculated from the Hessian matrix. The eigenvalues of H are called principal directions and are directions of pure curvature (no mixed partial derivatives). They are always orthogonal. The eigenvalues of H are called principal curvatures and are invariant under rotation. The eigenvalues are denoted as $K_1$ and $K_2$ and are always real valued. The principal curvature $K_1$ corresponds to the direction of maximum curvature while the principal curvature $K_2$ corresponds to the direction of minimum curvature.

The principal curvatures thus contain the shape information of the gray scale scan and may be used to calculate a normalized Koenderink shape index si according to the equation below:

$$si = \frac{2}{\pi}\arctan\frac{\kappa_2 + \kappa_1}{\kappa_2 - \kappa_1}, (\kappa_2 \geq \kappa_1)$$

Accordingly, the local shape index si may be calculated based on the calculated derivatives. FIG. 1 shows a scale for interpretation of the local shape index. The local shape index may have a value between −1 and +1 for every region of the gray scale medical image. Thus:

$$si \in [-1, +1]$$

Shape indexes may fall into one of several shape ranges, including a cup, trough, rut, saddle, ridge, dome and cap, as illustrated in FIG. 1. Here, we are concerned only with those regions having a shape index of between ⅜ and ⅝, corresponding to the "ridge" shape. All normalized derivative information with a shape index outside of this range may be zeroed out.

The diverging gradient field response (DGFR) may then be computed based on the normalized derivative information where only ridge information remains, using the equation:

$$DGFR(i, j, k) = \sum_{z \in \Omega} \sum_{y \in \Omega} \sum_{x \in \Omega} V_x(x, y, z) L_x +$$

$$\sum_{z \in \Omega} \sum_{y \in \Omega} \sum_{x \in \Omega} V_y(x, y, z) L_y + \sum_{z \in \Omega} \sum_{y \in \Omega} \sum_{x \in \Omega} V_z(x, y, z) L_z$$

where, $$V_x(x, y, z) = \frac{x}{\sqrt{x^2 + y^2 + z^2}}, V_y(x, y, z) = \frac{y}{\sqrt{x^2 + y^2 + z^2}},$$

$$V_z(x, y, z) = \frac{z}{\sqrt{x^2 + y^2 + z^2}}, \text{ and}$$

$$\Omega = [-\text{floor}(maskSize/2) \text{ to } +\text{floor}(maskSize/2)].$$

Accordingly, the DGFR may be calculated by vector convolution of a diverging gradient field with a vector field image having a cylindrical shape. This calculation may be conceptualized as analyzing the normalized derivative for the degree of match with the cylindrical shape of the vessels. Accordingly, high DGFR values may indicate the desired vessels. Thus, the DGFR may contribute to a discriminative feature such that the DGFR is used it discriminate whether a volume of interest within the medical image (such as a PE) is a true positive or a false positive.

Vessel identification may then be performed by identifying the volumes of the gray scale medical image corresponding to high DGFR response value. In a process known as visual enhancement, identified DGFR response intensity values may then be overlaid with the original image such that the identified vessels are highlighted or otherwise brought to the attention of the medical practitioner. The medical practitioner may then focus attention on the identified vessels and render a diagnosis.

Exemplary embodiments discussed above need not be limited to the identification of blood vessels. For example, other cylindrical body structures may be similarly found. For example, certain nerves, channels, and bones may be so identified.

FIG. 2 is a flow chart showing a method for detecting a substantially cylindrical internal structure in a medical image according to an exemplary embodiment of the present invention. First a medical image 22 may be acquired (Step S21). The medical image 22 may be acquired either from a medical image database 23 or from a medical image scanner 24. As described above, a gradient of the medical image 22 may then be calculated (Step S25). The local shape index may then be calculated based on the gradient (Step S26). All gradient data not having a local shape index fitting within the above-described ridge shape may be zeroed out (Step S27). DGFR may then be calculated based on the remaining gradient data (Step S28). The blood vessel or other cylindrical body structure may then be identified based on the DGFR information (Step S29). The identification may then be displayed on a display 30, for example, as a visual enhancement of the original medical image 22.

Moreover, exemplary embodiments of the present invention may be used to identify pulmonary embolisms (PEs). In the gray scale medical image, a PE may appear as a dark patch within a brightly colored vessel. The brightness of the vessel may be attributed to the presence of a contrast agent while the PE may appear as a dark because of its blockage of contrast-carrying blood.

The occlusion may be a full occlusion in which case, the PE would have a cylindrical shape, or the occlusions would be a partial occlusion. However, in either case, the PE would appear as a dark convex structure surrounded by a bright media and would accordingly have a large DGFR response.

In detecting a PE, as is described above, first normalized derivatives of the gray scale medical image are calculated. Then, local shape index information is computed based on the calculated derivatives. Here, we are concerned only with those regions having a shape index of between −5/8 and −3/8, corresponding to the "rut" shape (see FIG. 1). All normalized derivative information with local shape index information outside of this range may be zeroed out.

Because the PE appears as a dark area within a brightly colored background, the resulting gradient tends to point in a converging pattern. The gradient field may be reversed, for example by multiplying the gradient field by −1. This in turn results in a diverging gradient field, as was seen above for the case of vessel identification.

The diverging gradient field response (DGFR) may now be calculated based on the diverging gradient field, for example, as described above. Here, high DGFR values may indicate the potential presence of PE. The DGFR values can be used a discriminative feature value for a candidate to improve the detection accuracy of the statistical classifier in the PE Computer Aided Detection (CAD) system.

PE identification may be performed either separately or in addition to vessel identification. Where PE identification is performed on the same medical image as vessel identification, the attention of the medical practitioner may be drawn to both the identified vessel(s) and the identified PE(s).

Figure 3:
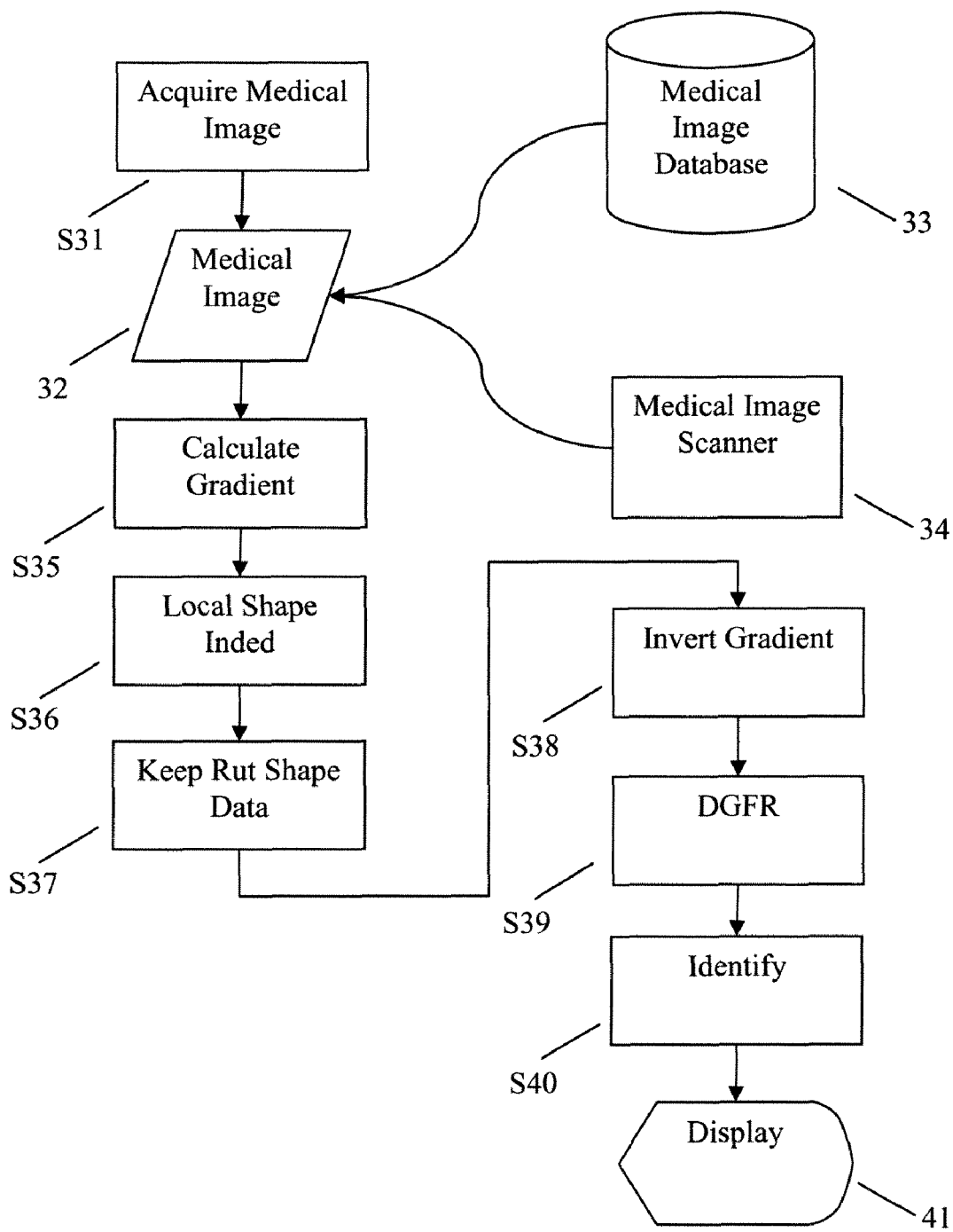
FIG. 3 is a flow chart showing a method for detecting an occlusion of a substantially cylindrical internal structure in a medical image according to an exemplary embodiment of the present invention.

FIG. 3 is a flow chart showing a method for detecting the presence of an occlusion, for example, a PE, in a substantially cylindrical internal structure in a medical image according to an exemplary embodiment of the present invention. First a medical image 32 may be acquired (Step S31). The medical image 32 may be acquired either from a medical image database 33 or from a medical image scanner 34. As described above, a gradient of the medical image 32 may then be calculated (Step S35). The local shape index is calculated based on the calculated gradients (Step S36). All gradient data having a local shape index not fitting within the above-described rut shape may be zeroed out (Step S37). The remaining gradient field may then be inverted (Step S38). The inversion may occur prior to or after the zeroing out step with no change in result. DGFR may then be calculated based on the remaining inverted gradient information (Step S39). The PE or other obstruction within a cylindrical body structure may then be identified based on the DGFR information (Step S40). Identification may include using the DGFR as a discriminative feature value set. The identified structure may then be displayed on a display 41, for example, as a visual enhancement of the original medical image 22.

Additionally, the ratio of the tubular and PE DGFR may be used as a feature, or may be mapped to an intensity value overlaid on the original image, with ratio near to 1 signifying greater likelihood of PE.

Exemplary embodiments of the present invention may combine methods for detecting cylindrical structures such as blood vessels, as discussed above, with methods for detecting occlusions such as pulmonary emboli. Accordingly, first a method for detecting the cylindrical structure may be followed, for example, as discussed above. After one or more cylindrical structures are identified, then a method for detecting occlusions may be performed for the isolated image data containing the cylindrical strucures, for example, as discussed above. Accordingly, time and processing resources needed to detect pulmonary emboli may be reduced and accuracy may be increased by narrowing the field of search for obstructions to the detected cylindrical structures.

Figure 4:
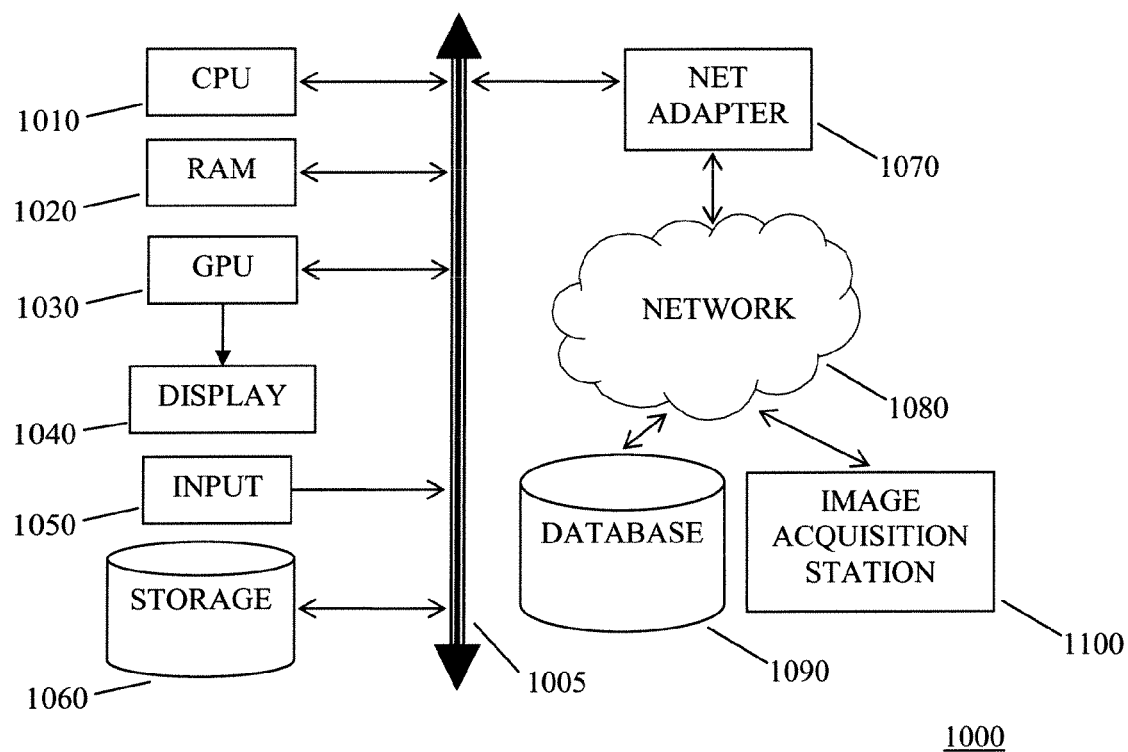
FIG. 4 shows an example of a computer system capable of implementing the method and apparatus according to exemplary embodiments of the present invention.

FIG. 4 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1010, random access memory (RAM) 1020, a graphical processing unit (GPU) 1030 connected to a display unit 1040, a network adapter 1070 connected to a network 1080, for example an intranet or the Internet, an internal bus 1005, and one or more input devices 1050, for example, a keyboard, mouse etc. As shown, the system 1000 may be connected to a data storage device 1060, for example, a hard disk.

The CPU 1010 may access and/or receive image data from an image acquisition station 1100 and/or a database 1090, for example, via the network 1080. The image acquisition station 1100 may include an MR scanner, a CT scanner or any other form of medical imaging device. The database 1090 may include previously acquired image data, for example, MR datasets and/or CT data sets.

The above specific exemplary embodiments are illustrative, and many variations can be introduced on these embodiments without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for detecting a substantially cylindrical internal structure from within a medical image in a medical image processing device, comprising:
   acquiring a medical image;
   calculating a gradient of the medical image;
   calculating local shape index information for the calculated gradient of the medical image;
   removing gradient information having a local shape index not indicative of a ridge shape;
   calculating a diverging gradient field response (DGFR) based on the remaining gradient information;
   using the DGFR as a discriminative feature in detecting the substantially cylindrical internal structure; and
   displaying the desired internal structure as a visual enhancement of the medical image.

2. The method of claim 1, wherein the substantially cylindrical internal structure is a blood vessel.

3. The method of claim 1, wherein the medical image is a computed tomography (CT) image, an magnetic resonance (MR) image, an ultrasound image, or a positron emission tomography (PET) image.

4. The method of claim 1, wherein calculating the gradient of the medical image includes calculating vectors of second-order partial derivatives along each special dimension.

5. The method of claim 1, wherein the calculated gradient of the medical image is normalized to a set of three-dimensional unit vectors prior to the calculation of the local shape index information.

6. The method of claim 1, wherein the local shape index information is calculated from a Hessian matrix of second-order partial derivatives of the medical image.

7. The method of claim 6, wherein the local shape index information si is calculated according to the equation:

$$si = \frac{2}{\pi}\arctan\frac{\kappa_2 + \kappa_1}{\kappa_2 - \kappa_1},$$

where $K_2$ represents an eigenvalue of the Hessian matrix corresponding to a direction of minimum curvature and $K_1$ represents an eigenvalue of the Hessian matrix corresponding to a direction of maximum curvature.

8. The method of claim 1, wherein the calculated local shape index information is normalized within the range of $[-1,+1]$.

9. The method of claim 8, wherein the local shape index information not indicative of the ridge shape is local shape index information not within the range of $[+3/8,+5/8]$.

10. The method of claim 1, wherein the DGFR is calculated by vector convolution.

11. The method of claim 1, additionally comprising the step of displaying the identified substantially cylindrical internal structure as a visual enhancement of the medical image.

12. The method of claim 1, additionally comprising:
   further removing gradient information having local shape index information not indicative of a rut shape;
   inverting the remaining gradient information;
   calculating a diverging gradient field response (DGFR) based on the inverted remaining gradient information; and
   using the DGFR as a discriminative feature to detect an occlusion of the substantially cylindrical internal structure.

13. A method for detecting an occlusion of a substantially cylindrical internal structure from within a medical image in a medical image processing device, comprising:
   acquiring a medical image;
   calculating a gradient of the medical image;
   calculating local shape index information based on the calculated gradient of the medical image;
   removing gradient information having local shape index information not indicative of a rut shape;
   inverting the remaining gradient information;
   calculating a diverging gradient field response (DGFR) based on the inverted remaining gradient information;
   using the DGFR as a discriminative feature in detecting the substantially cylindrical internal structure; and
   displaying the desired internal structure as a visual enhancement of the medical image.

14. The method of claim 13, wherein the substantially cylindrical internal structure is a blood vessel and the occlusion is an embolism.

15. The method of claim 13, wherein the medical image is a computed tomography (CT) image, an magnetic resonance (MR) image, an ultrasound image, or a positron emission tomography (PET) image.

16. The method of claim 13, wherein calculating the gradient of the medical image includes calculating vectors of second-order partial derivatives along each special dimension.

17. The method of claim 13, wherein the calculated gradient of the medical image is normalized to a set of three-dimensional unit vectors prior to the calculation of the local shape index information.

18. The method of claim 13, wherein the local shape index information is calculated from a Hessian matrix of second-order partial derivatives of the medical image.

19. The method of claim 18, wherein wherein the local shape index information si is calculated according to the equation:

$$si = \frac{2}{\pi}\arctan\frac{\kappa_2 + \kappa_1}{\kappa_2 - \kappa_1},$$

where $K_2$ represents an eigenvalue of the Hessian matrix corresponding to a direction of minimum curvature and $K_1$ represents an eigenvalue of the Hessian matrix corresponding to a direction of maximum curvature.

20. The method of claim 13, wherein the calculated local shape index information is normalized within the range of [−1,+1].

21. The method of claim 20, wherein the local shape index information not indicative of the rut shape is local shape index information not within the range of [−5/8,−3/8].

22. The method of claim 13, wherein the DGFR is calculated by vector convolution.

23. The method of claim 13, additionally comprising the step of displaying the occlusion as a visual enhancement of the medical image.

24. A method for detecting a desired internal structure from within a medical image in a medical image processing device, comprising:

acquiring a medical image;
calculating a gradient of the medical image;
calculating local shape index information for the calculated gradient of the medical image;
normalizing the calculated local shape index information within the range of [−1,+1];
removing gradient information having a local shape index not indicative of a predetermined shape;
calculating a diverging gradient field response (DGFR) based on the remaining local shape index information;
using the DGFR as a discriminative feature in detecting the desired internal structure; and
displaying the desired internal structure as a visual enhancement of the medical image.

25. The method of claim 24, wherein the predetermined shape is a ridge shape, the local shape index information not indicative of the ridge shape is local shape index information not within the range of [+3/8,+5/8], and the desired internal structure has a substantially cylindrical shape.

26. The method of claim 24, wherein:
the calculated gradient information is inverted prior to calculating the DGFR;
the predetermined shape is a rut shape;
the local shape index information not indicative of the rut shape is local shape index information not within the range of [−5/8,−3/8]; and
the desired internal structure is an occlusion within a substantially cylindrical shaped structure.

* * * * *